(12) United States Patent
Nakajima

(10) Patent No.: US 7,697,932 B2
(45) Date of Patent: Apr. 13, 2010

(54) METHOD FOR EFFICIENTLY SETTING COMMUNICATION PARAMETERS VIA REAL TIME INDEXING AND SELECTION OF ALGORITHM FOR SETTING THE PARAMETERS

(75) Inventor: Takafumi Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 11/527,513

(22) Filed: Sep. 27, 2006

(65) Prior Publication Data

US 2007/0088951 A1    Apr. 19, 2007

(30) Foreign Application Priority Data

Oct. 17, 2005  (JP)  ............................. 2005-302165
Aug. 30, 2006  (JP)  ............................. 2006-234367

(51) Int. Cl.
*H04W 4/00*    (2009.01)
(52) U.S. Cl. ................. 455/435.1; 455/432.1; 455/433; 370/338; 370/395.2; 709/228
(58) Field of Classification Search ................. 455/435, 455/410, 411, 452.1; 370/395.2, 338; 709/228
See application file for complete search history.

(56) References Cited

U.S. PATENT DOCUMENTS

2002/0061748 A1*  5/2002  Nakakita et al. ............ 455/435
2002/0147819 A1* 10/2002  Miyakoshi et al. .......... 709/228
2003/0115339 A1*  6/2003  Hodoshima .................. 709/228
2004/0114601 A1   6/2004  Watanabe et al. ......... 370/395.2
2005/0054326 A1*  3/2005  Rogers ....................... 455/410

FOREIGN PATENT DOCUMENTS

| EP | 1 276 275 | 1/2003 |
| EP | 1 307 003 | 5/2003 |
| EP | 1 396 976 | 3/2004 |
| EP | 1 411 674 | 4/2004 |
| JP | 2003-204335 | 7/2003 |
| JP | 2004-094736 | 3/2004 |
| JP | 2004-215232 | 7/2004 |

* cited by examiner

*Primary Examiner*—Nick Corsaro
*Assistant Examiner*—Chuong A Ngo
(74) *Attorney, Agent, or Firm*—Fitzpatrick, Cella, Harper & Scinto

(57) ABSTRACT

To set communication parameters, a communication apparatus identifies a communication parameter setting wireless network on the basis of a network identifier provided in itself. If the communication apparatus can identify any network identifier matching the network identifier provided in itself, it sets the communication parameters in cooperation with another communication apparatus in the wireless network. If no identifier can be identified, the communication apparatus switches the setting of the communication parameters to a manual operation.

15 Claims, 15 Drawing Sheets

F I G. 5

| AUTOMATIC COMMUNICATION PARAMETER SETTING METHOD | COMMUNICATION PARAMETER SETTING NETWORK SSID |
|---|---|
| FIRST AUTOMATIC COMMUNICATION PARAMETER SETTING METHOD 113 | SSID=ABC |
| SECOND AUTOMATIC COMMUNICATION PARAMETER SETTING METHOD 114 | SSID=DEF |
| THIRD AUTOMATIC COMMUNICATION PARAMETER SETTING METHOD 115 | SSID=GHI |

FIG. 12

| AUTOMATIC COMMUNICATION PARAMETER SETTING METHOD | ENCRYPTION KEY FOR AUTHENTICATION FOR COMMUNICATION PARAMETER SETTING |
|---|---|
| FOURTH AUTOMATIC COMMUNICATION PARAMETER SETTING METHOD 1010 | ENCRYPTION KEY 1201={dAe3aigjBxcQfai234ve} |
| FIFTH AUTOMATIC COMMUNICATION PARAMETER SETTING METHOD 1011 | ENCRYPTION KEY 1202={nKebafa802OnrMep13rt} |
| SIXTH AUTOMATIC COMMUNICATION PARAMETER SETTING METHOD 1012 | ENCRYPTION KEY 1203={bveJ3idc4Wer3209x335} |

F I G. 15
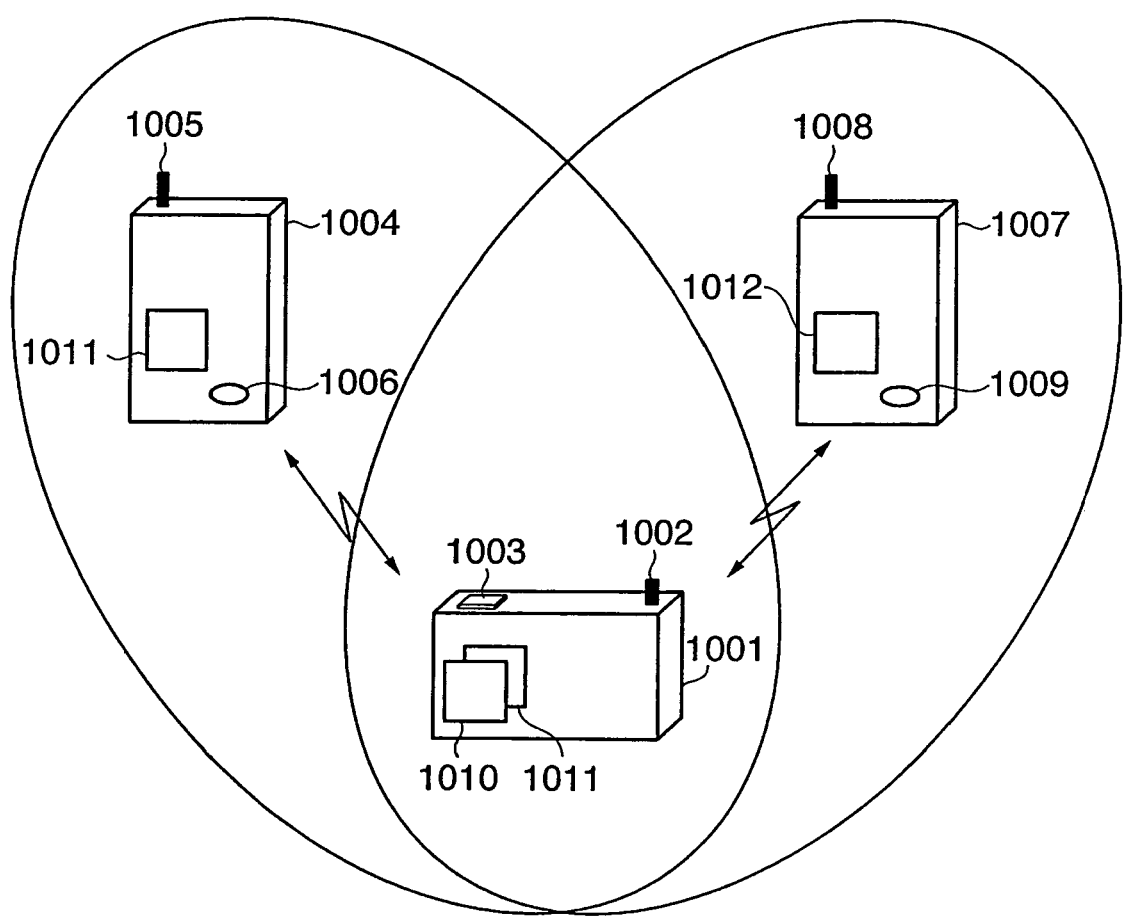

METHOD FOR EFFICIENTLY SETTING COMMUNICATION PARAMETERS VIA REAL TIME INDEXING AND SELECTION OF ALGORITHM FOR SETTING THE PARAMETERS

BACKGROUND OF THE INVENTION

1. Field of the Invention

The present invention relates to a communication apparatus and a communication parameter setting method which automatically set communication parameters for a wireless network.

2. Description of the Related Art

To communicate on a wireless LAN, communicating instruments need to set wireless LAN parameters (hereinafter referred to as communication parameters) such as an SSID (Service Set ID), an encryption key, an authentication scheme, and an authentication key. Configuration of these communication parameters has been cumbersome to users, and various methods have been proposed for simplifying the process.

For example, Japanese Patent Laid-Open No. 2003-204335 describes a method in which if wireless network identification information contained in a beacon matches wireless network identification information stored in a communication instrument, corresponding fixed communication parameters are set for wireless communication. The beacon is a signal transmitted by an instrument having already constructed a wireless network. The instrument having received the beacon pre-stores the fixed communication parameters and the corresponding wireless network identification information.

Japanese Patent Laid-Open No. 2004-094736 describes a method which compares the wireless network identification information contained in the beacon with multiple pieces of network identification information stored in the communication instrument, and if the former matches any of the latter, selects and sets the corresponding communication parameters. This document also describes an operation of the communication parameter setting method which enables switching between automatic and manual selecting means.

However, with the methods for setting communication parameters described in Japanese Patent Laid-Open Nos. 2003-204335 and 2004-094736, the setting communication parameters are fixed. Consequently, if a third party obtains the fixed communication parameters by eavesdropping, security is disadvantageously compromised.

To solve this problem, a method has been proposed which automatically generates and sets communication parameters. The following has actually been implemented as a product: a method of automatically transferring communication parameter settings for an access point (repeater) and a station (terminal) from the access point to the station via simple operations. With the method for setting communication parameters between an access point and a station, the communication instruments use communication parameter setting wireless network identification information (for example, an encryption key) to construct a communication parameter setting wireless network to set the communication parameters.

With the method for automatically setting the communication parameters, for some of the communication parameters, different parameters are generated and set for each communication. This makes it possible to achieve both security and convenience. Operations based on this technique are described in Japanese Patent Laid-Open No. 2004-215232.

However, various methods for automatically setting the communication parameters are now available, that is, the method for automatically setting the communication parameters varies. Thus, if an instrument supports a plurality of automatic communication parameter setting methods, one of the automatic communication parameter setting methods must be selected to set the communication parameters. It is possible to allow users to select one of the automatic communication parameter setting methods. However, doing so increases the number of operations that must be performed by the user.

SUMMARY OF THE INVENTION

The present invention is made to solve these problems. An object of the present invention is to enable communication parameters to be more easily set.

To achieve this object, according to an aspect of the present invention, there is provided a communication parameter setting method for communication apparatuses which automatically set communication parameters for a wireless network, the method comprising: a detection step of detecting a network identifier for the wireless network; and a setting step of setting the communication parameters by a communication parameter setting method corresponding to the network identifier detected in the detection step.

Moreover, according to an aspect of the present invention, there is provided a communication parameter setting method for communication apparatuses which automatically set communication parameters for a wireless network, the method comprising: an authentication step of carrying out authentication between the communication apparatuses; and the setting step of, in accordance with the authentication in the authentication step, setting the communication parameters by a communication parameter setting method corresponding to information used for the authentication.

Moreover, according to an aspect of the present invention, there is provided a communication apparatuses comprising: a detection unit adapted to detect a network identifier for a wireless network; and a setting unit adapted to select a communication parameter setting method corresponding to the network identifier detected by the detection means and setting the communication parameters by the selected communication parameter setting method.

Moreover, according to an aspect of the present invention, there is provided a communication apparatus comprising: a determination unit adapted to determine whether or not authentication between the communication apparatus and another communication apparatus is successful; and a setting unit adapted to, depending on the determination by the determination unit, setting the communication parameters by a communication parameter setting method corresponding to information used for the authentication.

Further features of the present invention will become apparent from the following description of exemplary embodiments with reference to the attached drawings.

BRIEF DESCRIPTION OF THE DRAWINGS

FIG. 5 is a diagram showing an exemplary network SSID used in the automatic communication parameter setting method;

FIG. 12 is a diagram showing an exemplary encryption key for authentication which is used in an automatic communication parameter setting method;

FIG. 15 is a diagram showing the exemplary configuration of a wireless LAN system according to a third embodiment.

DESCRIPTION OF THE EMBODIMENTS

With reference to the drawings, a detailed description will be given of the best mode for carrying out the present invention.

First Embodiment

Figure 1:
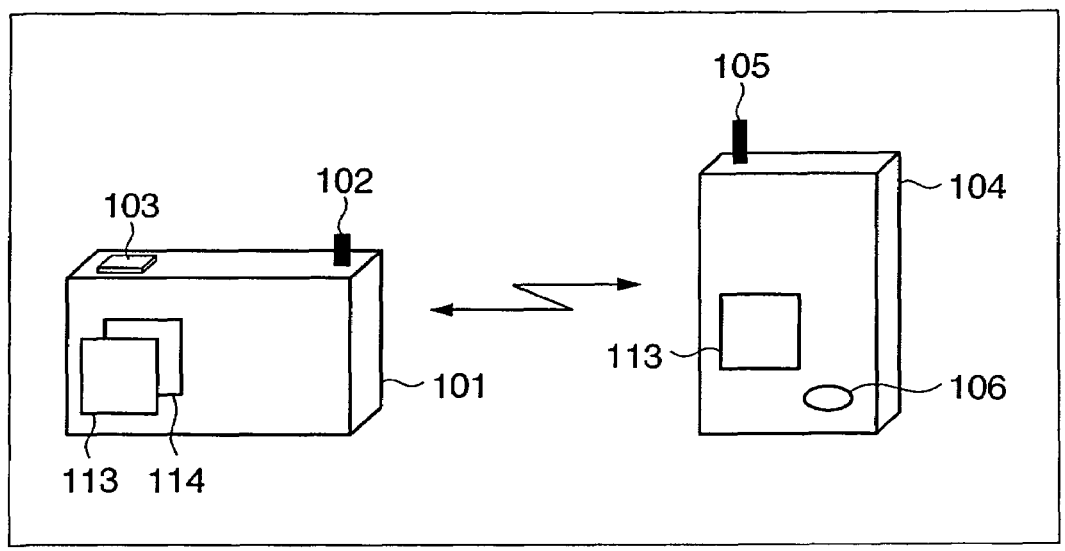
FIG. 1 is a diagram showing an exemplary wireless LAN system composed of a wireless terminal 101 and a first access point 104.

FIG. 1 is a diagram showing an exemplary wireless LAN system composed of a wireless terminal 101 and a first access point 104. The first access point 104 has a wireless communication function 105 specified in IEEE 802.11x. Note that IEEE 802.11x specification represents IEEE 802.11 and specification (e.g. 802.11a, 802.11b, 802.11g, etc.) associated with IEEE 802.11. Depressing an automatic communication parameter setting activation button 106 allows a communication parameter setting wireless network to be constructed to start automatic communication parameter setting. The communication parameters include a network identifier (SSID: Service Set ID), an encryption key, an authentication scheme, and an authentication key.

The wireless terminal 101 also has a wireless communication function 102 specified in IEEE 802.11x. Depressing an automatic communication parameter setting activation button 103 starts automatic communication parameter setting.

Figure 2:
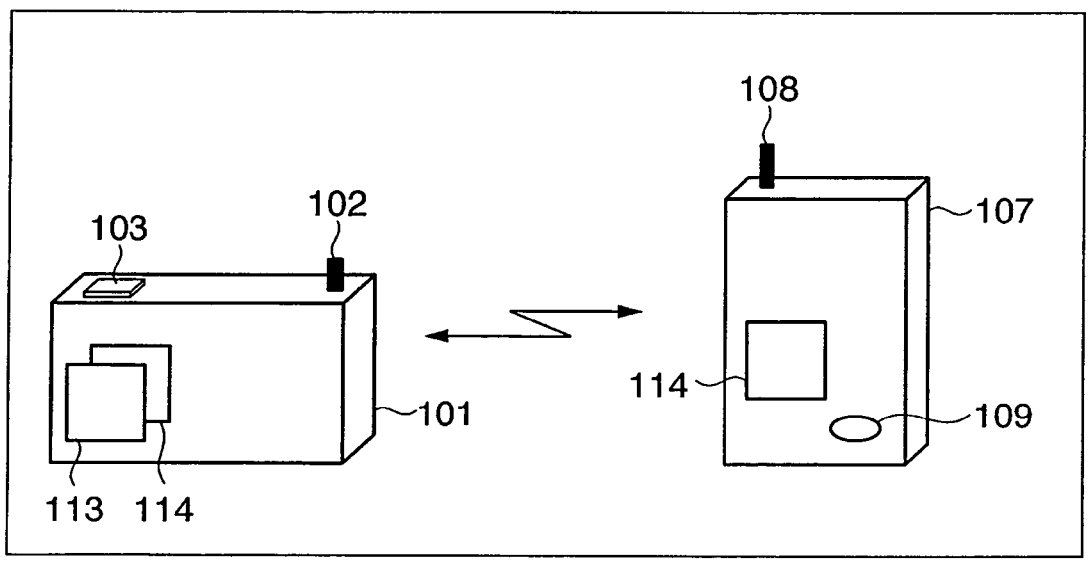
FIG. 2 is a diagram showing an exemplary wireless LAN system composed of the wireless terminal 101 and a second access point 107.

FIG. 2 is a diagram showing an exemplary wireless LAN system composed of the wireless terminal 101 and a second access point 107. Like the first access point, the second access point 107 has a wireless communication function 108. Depressing an automatic communication parameter setting activation button 109 allows a communication parameter setting wireless network to be constructed to start automatic communication parameter setting.

Figure 3:
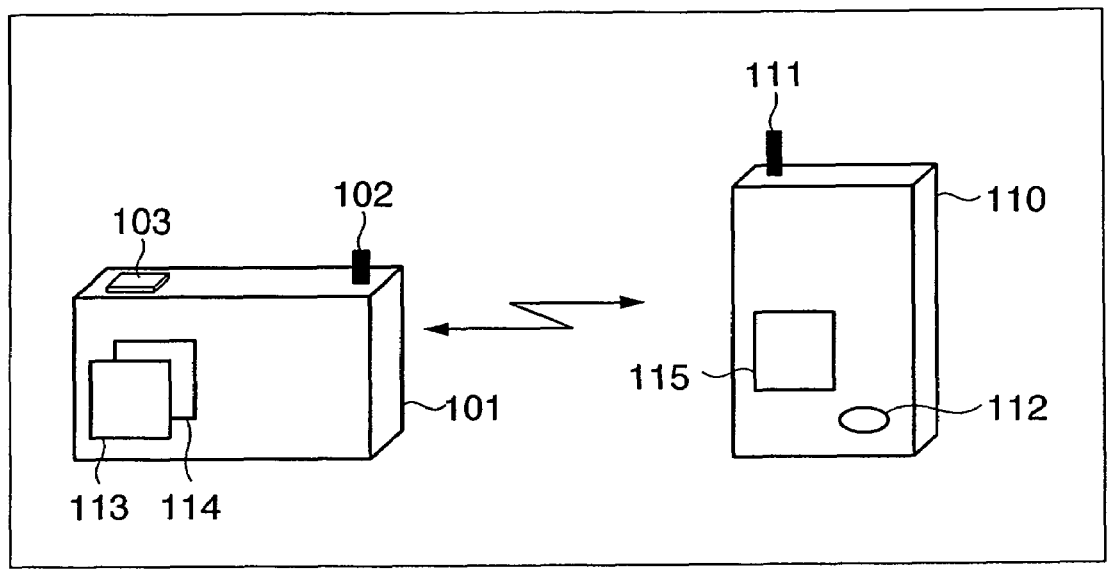
FIG. 3 is a diagram showing an exemplary wireless LAN system composed of the wireless terminal 101 and a third access point 110.

FIG. 3 is a diagram showing an exemplary wireless LAN system composed of the wireless terminal 101 and a third access point 110. Like the first access point, the third access point 110 has a wireless communication function 111. Depressing an automatic communication parameter setting activation button 112 allows a communication parameter setting wireless network to be constructed to start automatic communication parameter setting.

Figure 4:
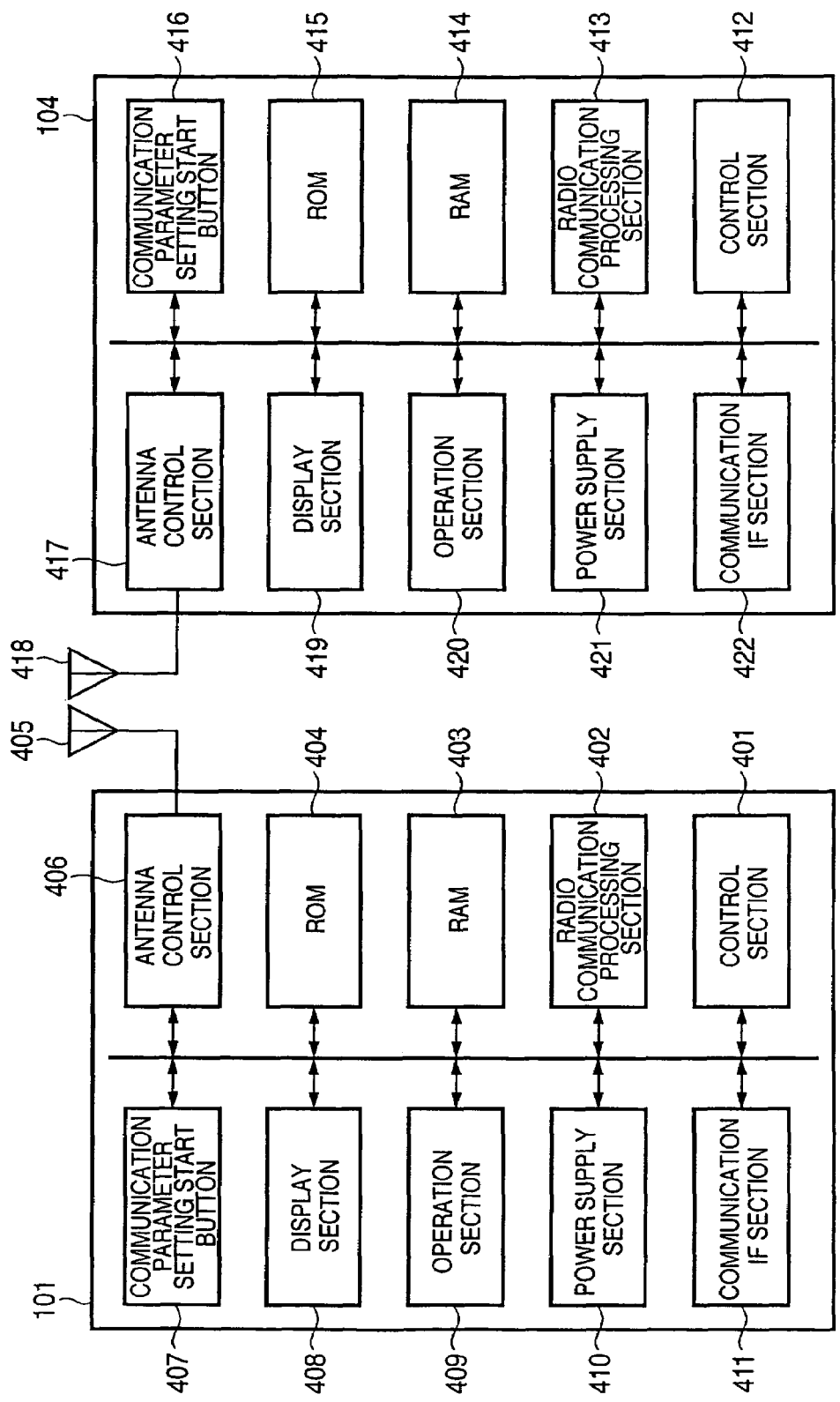
FIG. 4 is a block diagram showing the exemplary internal arrangements of the wireless terminal 101 and access point 104.

With reference to FIG. 4, description will be given of the internal arrangements of the wireless terminal 101 and first access point 104. The internal arrangements of a second access point 107 and a third access point 110 are similar to that of the first access point 104. Accordingly, its description is omitted.

FIG. 4 is a block diagram showing the exemplary internal arrangements of the wireless terminal 101 and access point 104. In the block diagram of the wireless terminal 101, reference numeral 401 denotes a control section that controls the wireless terminal in accordance with a program stored in a ROM described below. Reference numeral 402 denotes a wireless communication processing section that controls wireless LAN communication. Reference numeral 403 denotes a RAM that is a memory in which work areas and tables used by the control section 401 to perform control are defined. Reference numeral 404 denotes a ROM that stores control commands (programs) and control data.

Reference numeral 406 denotes an antenna control section that controls an antenna 405. Reference numeral 407 denotes a communication parameter setting start button that activates communication parameter setting. Reference numeral 408 denotes a display section that uses LCDs or LEDs to display the status of the wireless terminal and operation inputs via an operation section described below. Reference numeral 409 denotes the operation section including buttons used to instruct the wireless terminal to perform corresponding operations. Reference numeral 410 denotes a power supply section including a secondary battery. Reference numeral 411 denotes a communication interface section that is not wireless but is wired, for example, a USB or IEEE 1394 communication interface.

The communication parameter setting start button 407 corresponds to an automatic communication parameter setting activation button 103, shown in FIG. 1. Description will be given of a process for automatically setting communication parameters.

In the block diagram of the first access point 104, reference numeral 412 denotes a control section that controls an access point in accordance with a program stored in a ROM described below. Reference numeral 413 denotes a wireless communication processing section that carries out wireless LAN construction or communication control. Reference numeral 414 denotes a RAM that is a memory in which work areas and tables used by the control section 412 to perform control are defined. Reference numeral 415 denotes a ROM that stores control commands (programs) and control data.

Reference numeral 416 denotes a communication parameter setting start button. Depressing the button starts a process for automatically setting communication parameters. Reference numeral 417 denotes an antenna control section that controls an antenna 418. Reference numeral 419 denotes a display section that uses LCDs or LEDs to display the status of the access point and operation inputs via an operation section described below. Reference numeral 420 denotes the operation section including buttons used to instruct the access point to perform corresponding operations. Reference numeral 421 denotes a power supply section. Reference numeral 422 denotes a communication interface section that is not wireless but is wired, for example, a USB or IEEE 1394 communication interface.

The communication parameter setting start button 416 corresponds to an automatic communication parameter setting activation button 106 (109 shown in FIG. 2 or 112 shown in FIG. 3), shown in FIG. 1. Description will be given of a process for automatically setting communication parameters.

In the above configuration, the first access point 104 corresponds to a first automatic communication parameter setting method 113. The second access point 107 corresponds to a second automatic communication parameter setting method 114. The third access point 110 corresponds to a third automatic communication parameter setting method 115.

The wireless terminal 101 corresponds to both the first automatic communication parameter setting method 113 and second automatic communication parameter setting method 114.

The automatic communication parameter setting method automatically sets communication parameters using predetermined procedure and messages between connecting instruments. Manufacturers often adopt proprietary automatic communication parameter setting methods. Consequently, instruments that do not support a common automatic communication parameter setting method use different procedures to set the communication parameters or use different decodable messages. These instruments thus cannot set the communication parameters by an automatic setting method. On the other hand, instruments that support a common automatic communication parameter setting method can easily set the communication parameters by the automatic setting method.

An exemplary method for automatically setting the communication parameters is shown below.

First, an instrument A uses a pre-stored communication parameter setting SSID, encryption scheme, and encryption key to construct a communication parameter setting network. An instrument B pre-stores the same communication parameter setting SSID, encryption scheme, and encryption key as those for the instrument A. The instrument B uses them to join the communication parameter setting network constructed by the instrument A. The instrument A in the communication parameter setting network then automatically generates communication parameters used for normal data communication. The instrument A transmits the communication parameters generated to the instrument B. Upon receiving the communication parameters for data communication transmitted by the instrument A, the instrument B sets the communication parameters in itself. Data communication is enabled by thus constructing a new data communication network between the instruments A and B. This setting method enables data communication parameters to be varied every time an automatic communication parameter setting method is executed. This improves security compared to the construction of a communication network with fixed values for each setting.

Alternatively, a communication parameter setting network is formed by using the pre-stored SSID, encryption scheme, and encryption key between the access point and the wireless terminal. In the communication parameter setting network formed, the communication parameters for data communication pre-stored in the access point are transferred to the wireless terminal. The transferred communication parameters are set in the wireless terminal. This setting method enables the same communication parameters as those for an existing network to be easily set for a wireless terminal that is to join this network.

As described above, the communication parameters may be varied for each setting. The same communication parameters are not necessarily set for all instruments that support a common automatic setting method. For example, communication parameters set between the instruments A and B by a first automatic communication parameter setting method may be different from those set between the instruments A and C by the first automatic communication parameter setting method.

On the other hand, the same communication parameters may be set in spite of different automatic setting methods. For example, if both the instruments A and B that are to set communication parameters support the first and second automatic communication parameter setting methods, the same communication parameters may be set regardless of the setting method used.

With reference to FIG. 5, description will be given of a communication parameter setting network SSID used in the first automatic communication parameter setting method 113, second automatic communication parameter setting method 114, and third automatic communication parameter setting method 115.

FIG. 5 is a diagram showing an exemplary network SSID (network identifier) used in the automatic communication parameter setting method. As shown in FIG. 5, the first automatic communication parameter setting method 113 constructs a wireless network for automatically setting communication parameters using SSID=ABC. SSID=ABC is contained in a beacon transmitted by instruments that are to construct a wireless network for first automatic communication parameter setting. Similarly, the second automatic communication parameter setting method 114 constructs a wireless network for automatically setting communication parameters using SSID=DEF. SSID=DEF is contained in a beacon transmitted by instruments that are to construct a wireless network for second automatic communication parameter setting. The third automatic communication parameter setting method 115 constructs a wireless network for automatically setting communication parameters using SSID=GHI. SSID=GHI is contained in a beacon transmitted by instruments that are to construct a wireless network for third automatic communication parameter setting.

Now, with reference to FIGS. 6 and 7, description will be given of a process for selecting an automatic communication parameter setting method to automatically set communication parameters according to the first embodiment.

Figure 6:
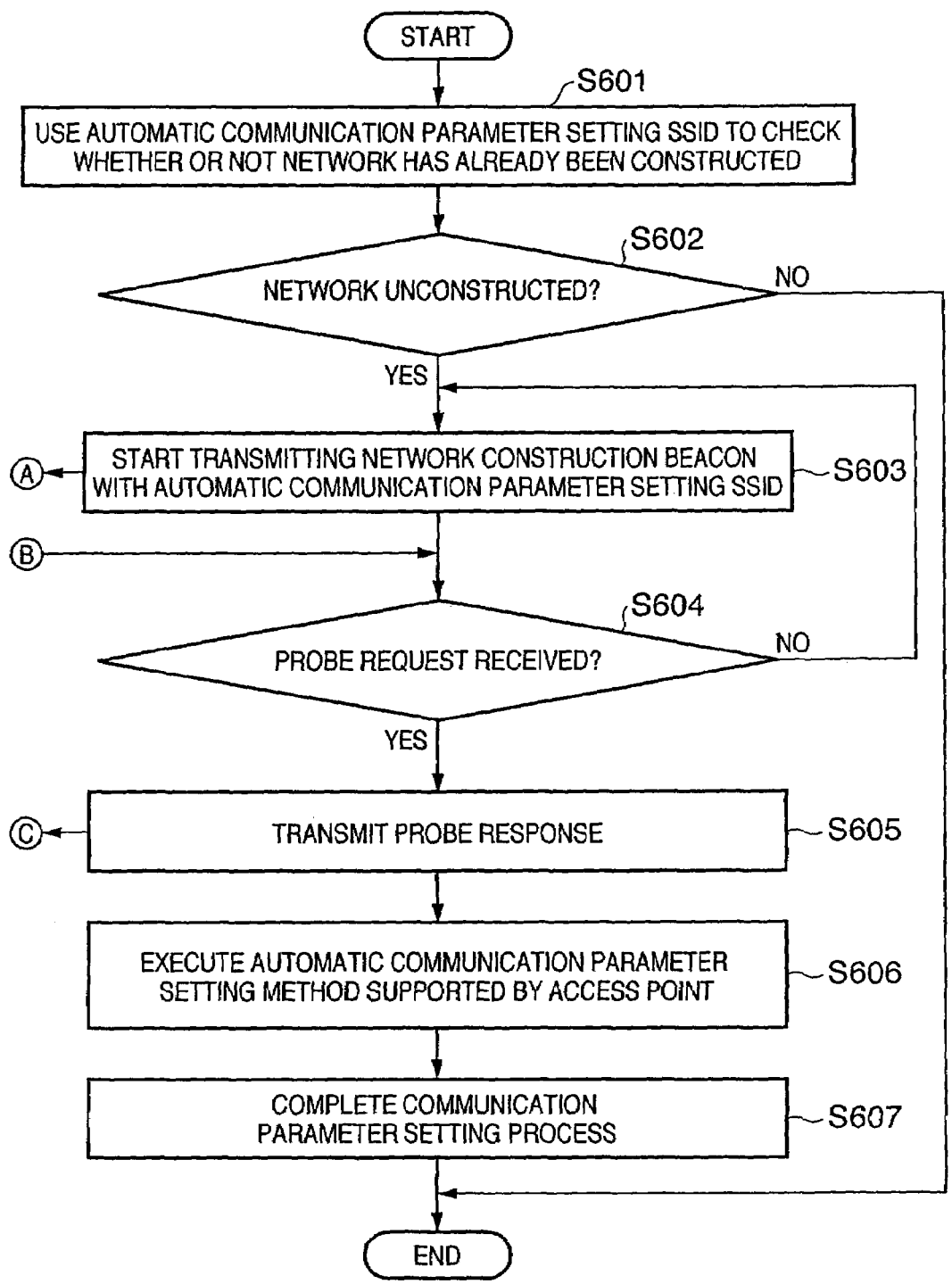
FIG. 6 is a flowchart showing an automatic communication parameter setting process at the access point.

FIG. 6 is a flowchart showing an automatic communication parameter setting process at the access point. Now, the first access point 104 will be described by way of example. However, similar processing is executed at other access points.

First, a user depresses an automatic communication parameter setting activation button 106. The first access point 104 then uses the communication parameter setting SSID=ABC to check whether or not a wireless network has already been constructed (step S601). If no network has been constructed (YES in step S602), the first access point 104 constructs an automatic communication parameter setting wireless network and starts transmitting a beacon containing the SSID=ABC (step S603).

The first access point 104 subsequently waits to receive a probe request containing the SSID=ABC from the wireless terminal 101 (step S604). Upon receiving the probe request, the first access point 104 compares the SSID contained in the probe request with the SSID for the wireless network. When the SSIDs match each other (YES in step S604), the first access point transmits a probe response to the wireless terminal 101 (step S605).

The first access point 104 and wireless terminal 101 then set the communication parameters by the first automatic communication parameter setting method 113 (step S606). Once the communication parameters are completely set (step S607), data such as images can be communicated by wireless using the set communication parameters.

Figure 7:
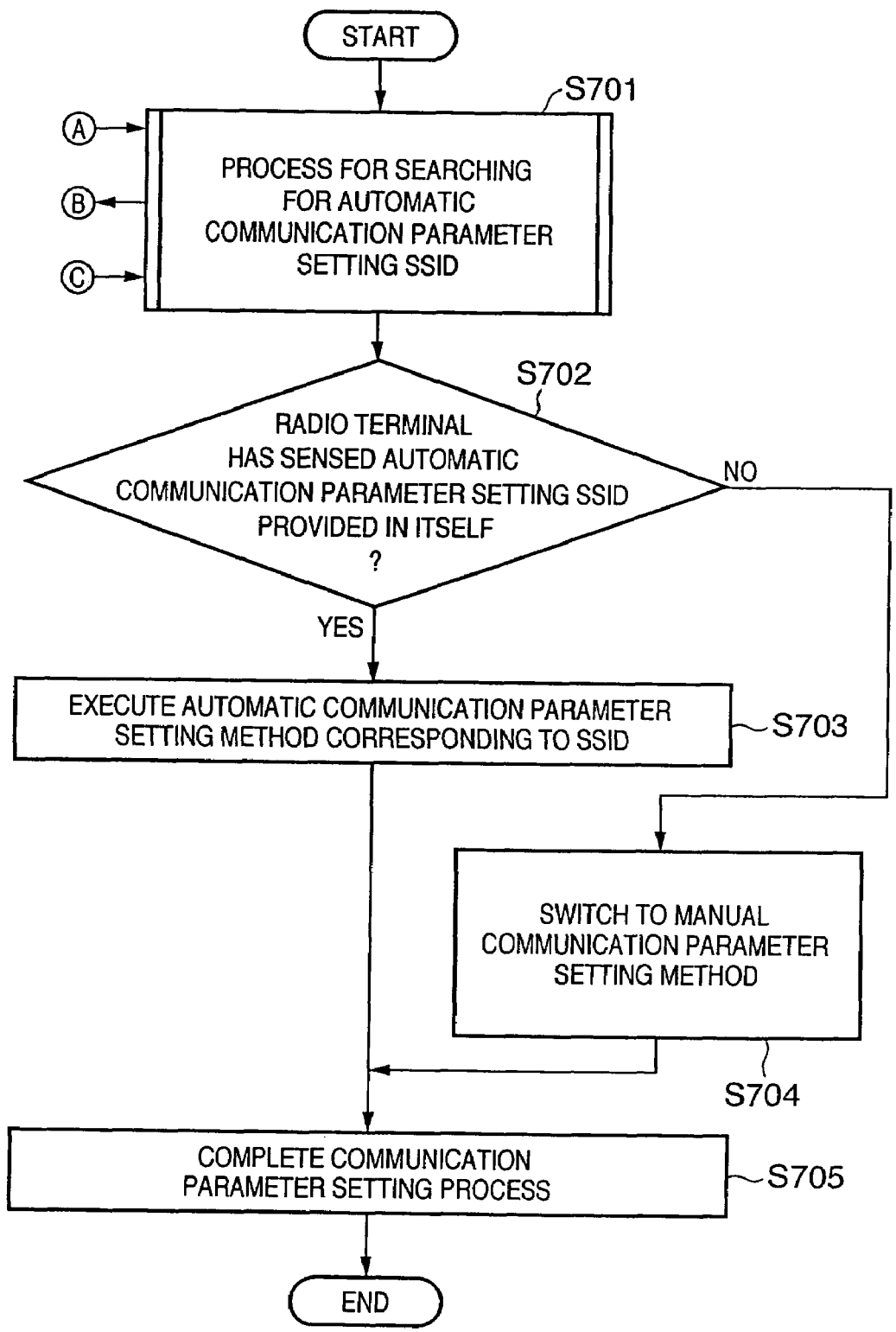
FIG. 7 is a flowchart showing an automatic communication parameter setting process in the wireless terminal 101.

FIG. 7 is a flowchart showing an automatic communication parameter setting process in the wireless terminal 101. First, a user depresses the automatic communication parameter setting activation button 103. The wireless terminal 101 searches for an automatic communication parameter setting SSID (step S701). In this case, the wireless terminal 101 checks whether or not an automatic communication parameter setting wireless network has been constructed using two automatic communication parameter setting SSIDs (ABC and DEF) stored in the wireless terminal 101. This search process will be described with reference to FIGS. 8 and 9.

Now, description will be given of the case where with the first configuration shown in FIG. 1, the wireless terminal 101 determines, as result of a search process, that the first access point 104 has constructed a first automatic communication parameter setting wireless network (SSID=ABC).

If the wireless terminal 101 senses the automatic communication parameter setting SSID stored in itself (YES in step S702), it executes an automatic communication parameter setting method corresponding to that SSID (step S703). The wireless terminal 101 and first access point 104 use the first automatic communication parameter setting method 113 to set the communication parameters (SSID (Service Set ID), encryption key, authentication scheme, and authentication key). Once the communication parameters are completely set (step S705), data such as images can be communicated by wireless using the set communication parameters.

Now, description will be given of the case where with the second configuration shown in FIG. 2, the wireless terminal 101 determines, as result of a search process, that the second access point 107 has constructed a second automatic communication parameter setting wireless network (SSID=DEF).

In this case, the second access point 107 executes an automatic communication parameter setting process similarly to the first access point 104 in accordance with the flowchart shown in FIG. 6. The wireless terminal 101 also executes a process for searching for an automatic communication parameter setting SSID.

If the wireless terminal 101 senses the automatic communication parameter setting SSID stored in itself (YES in step S702), it executes an automatic communication parameter setting method corresponding to that SSID (step S703). The wireless terminal 101 and second access point 107 use the second automatic communication parameter setting method 114 to set the communication parameters. Once the communication parameters are completely set (step S705), data such as images can be communicated by wireless using the set communication parameters.

Now, description will be given of the case where with the third configuration shown in FIG. 3, the wireless terminal 101 determines, as result of a search process, that the third access point 110 has constructed a third automatic communication parameter setting wireless network (SSID=GHI).

In this case, the third access point 110 executes an automatic communication parameter setting process similarly to the first access point 104 in accordance with the flowchart shown in FIG. 6. The wireless terminal 101 also executes a process for searching for an automatic communication parameter setting SSID.

The wireless terminal 101 cannot sense the automatic communication parameter setting SSID stored in itself (NO in step S702). That is, in this case, a network has been constructed using the automatic communication parameter setting SSID=GHI. Accordingly, the wireless terminal 101 switches to a manual method for setting the communication parameters (step 3704).

Now, description will be given of a process in which the wireless terminal 101 searches for a wireless network for automatic communication parameter setting (S701 shown in FIG. 7), taking the case of two search processing methods shown in FIGS. 8 and 9. Here, the first configuration shown in FIG. 1 will be described. However, of course, other configurations can be similarly processed.

<Search Processing Method 1>

Figure 8:
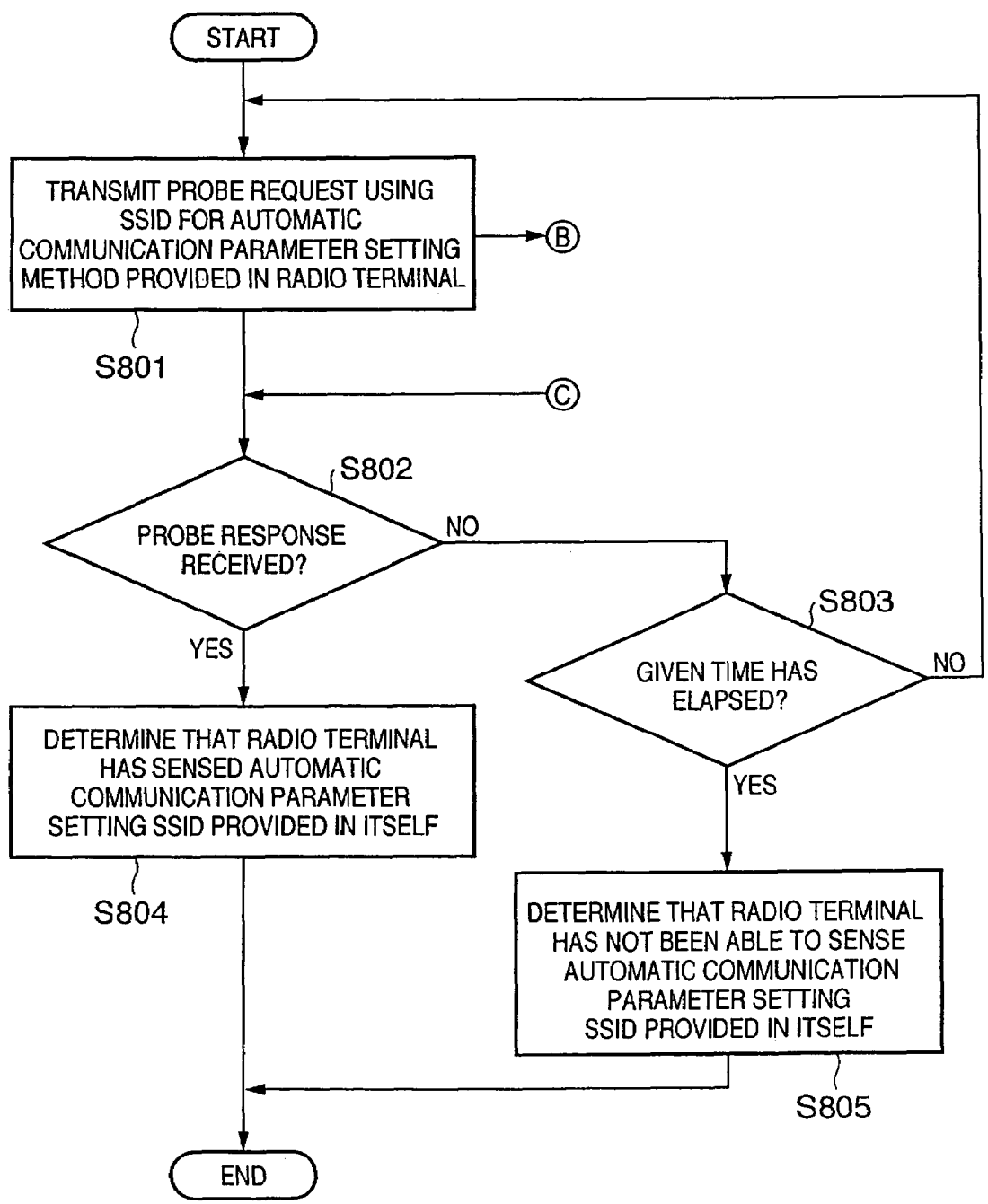
FIG. 8 is a flowchart showing a search determining process in a search processing method 1.

FIG. 8 is a flowchart showing a search determining process in a search processing method 1. When the automatic communication parameter setting activation button 103 is depressed, the wireless terminal 101 transmits a probe request containing the automatic communication parameter setting SSID=ABC and a probe request containing the automatic communication parameter setting SSID=DEF; the SSID=ABC and SSID=DEF are stored in the wireless terminal 101 (step S801). In the configuration shown in FIG. 1, the first access point 104 has already constructed a network for the SSID=ABC and thus transmits a probe response to the probe request to the wireless terminal 101. Upon receiving the probe response (YES in step S802), the wireless terminal 101 can confirm that the first access point 104 has constructed the wireless network for automatic communication parameter setting. The wireless terminal 101 thus determines that it has been able to sense the automatic communication parameter setting SSID stored in itself (step S804). The wireless terminal 101 then ends the search process.

In another case, the wireless terminal 101 cannot receive the probe response, and a given time elapses after the probe transmission (YES in step S803). The wireless terminal 101 then determines that it has not been able to sense the automatic communication parameter setting SSID stored in itself (step S805). The wireless terminal 101 then ends the search process.

In step S801, the wireless terminal 101 may consecutively transmit the probe request with the SSID=ABC set and the probe request with the SSID=DEF set. Alternatively, the wireless terminal 101 may transmit one of the probe requests, and if it cannot receive any probe response for the given time (steps S802 and 803), it transmits the other probe request.

<Search Processing Method 2>

Figure 9:
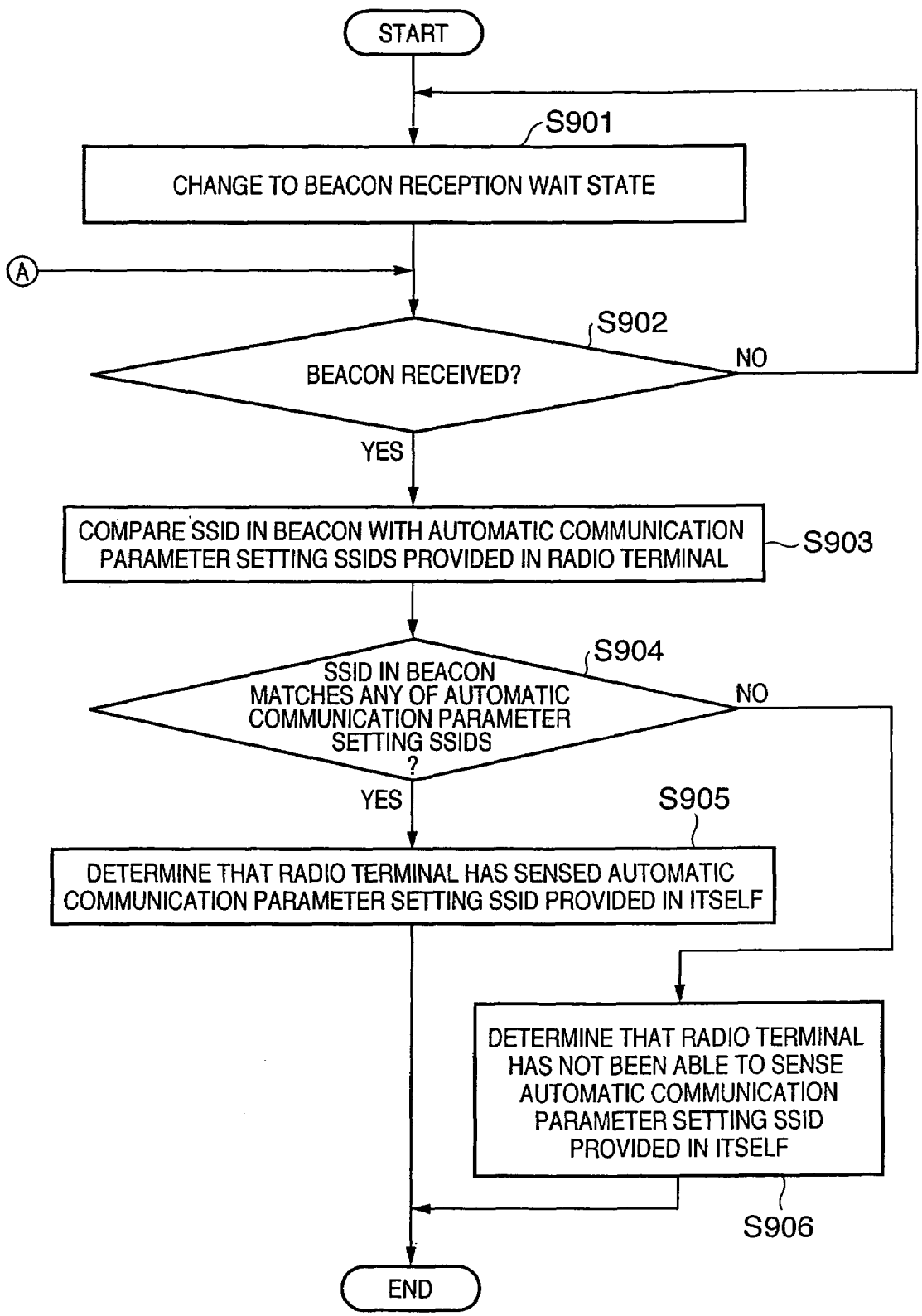
FIG. 9 is a flowchart showing a search determining process in a search processing method 2.

FIG. 9 is a flowchart showing a search determining process in a search processing method 2. When the automatic communication parameter setting activation button 103 is depressed, the wireless terminal 101 changes to a state in which it waits to receive beacons containing the automatic communication parameter setting SSIDs (ABC and DEF) stored in itself (step S901). Specifically, the wireless terminal 101 changes to the state in which it waits to receive a beacon with the SSID=ABC set and a beacon with the SSID=DEF set. In the configuration shown in FIG. 1, if the first access point 104 has already constructed a network for the SSID=ABC, it has already transmitted a beacon containing the SSID=ABC. If the wireless terminal 101 then receives this beacon (YES in step S902), it compares the SSID=ABC contained in the beacon with the automatic communication parameter setting SSIDs (ABC and DEF) stored in itself (step S903). When the former matches either of the latter (YES in step S904), the wireless terminal 101 then determines that it has been able to sense that automatic communication parameter setting SSID stored in itself (step S905). The wireless terminal 101 then ends the search process.

If the wireless terminal 101 has not been able to receive the beacon with the appropriate SSID (NO in step S904), it determines that it has not been able to sense the automatic communication parameter setting SSID stored in itself (step S906). The wireless terminal 101 then ends the search process.

The above search processing methods 1 and 2 may be individually used or combined with each other.

Thus, in the present embodiment, the wireless terminal pre-stores the SSIDs used for the corresponding automatic communication parameter setting methods, and uses the SSIDs to search for an access point having constructed a communication parameter setting network. As a result of the search, the wireless terminal and the access point supporting the common automatic communication parameter setting method can easily set the communication parameters.

The communication parameter setting network is constructed in response to depression of the automatic communication parameter setting activation button at the access point. This allows the communication parameters to be set only as desired by the user, ensuring security. The present embodiment also avoids the wasteful use of the wireless communication line.

The search process is executed in response to depression of the automatic communication parameter setting activation button at the wireless terminal. This allows the communication parameters to be set only as desired by the user, ensuring security. The present embodiment also avoids the wasteful use of the wireless communication line.

Second Embodiment

Now, a second embodiment according to the present invention will be described below in detail with reference to the drawings.

Figure 10:
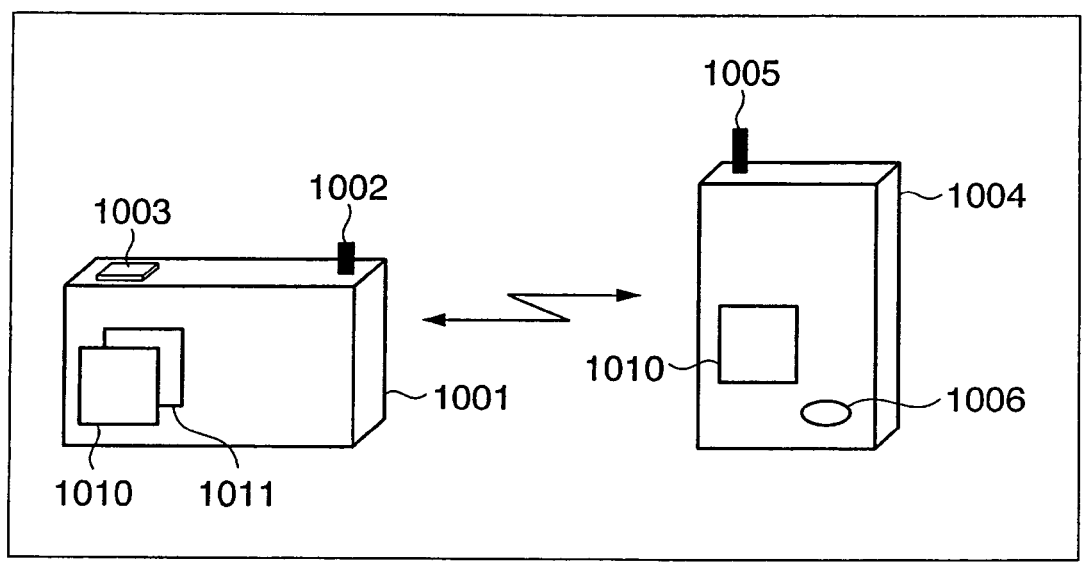
FIG. 10 is a diagram showing an exemplary wireless LAN system composed of a wireless terminal 1001 and a fourth access point 1004.

FIG. 10 is a diagram showing an exemplary wireless LAN system composed of a wireless terminal 1001 and a fourth access point 1004. The fourth access point 1004 has a wireless communication function 1005 specified in IEEE 802.11x. Depressing an automatic communication parameter setting activating button 1006 allows a communication parameter setting wireless network to be constructed.

The wireless terminal 1001 also has a wireless communication function 1002 specified in IEEE 802.11x. Depressing an automatic communication parameter setting activation button 1003 starts automatic communication parameter setting.

Figure 11:
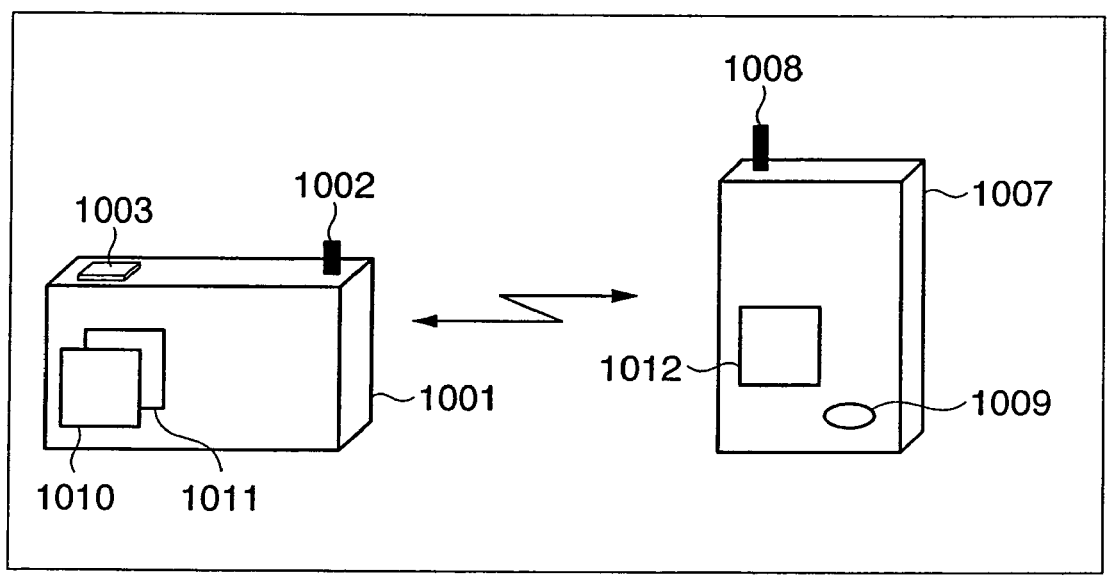
FIG. 11 is a diagram showing an exemplary wireless LAN system composed of the wireless terminal 1001 and a fifth access point 1007.

FIG. 11 is a diagram showing an exemplary wireless LAN system composed of the wireless terminal 1001 and a fifth access point 1007. Like the fourth access point 1004, the fifth access point 1007 has a wireless communication function 1008. Depressing an automatic communication parameter setting activation button 1009 allows a communication parameter setting wireless network to be constructed.

The internal arrangements of the wireless terminal 1001, fourth access point 1004, and fifth access point 1007 are similar to those in the first embodiment. Accordingly, their description is omitted.

In the above configuration, the wireless terminal 1001 corresponds to both fourth automatic communication parameter setting method 1010 and fifth automatic communication parameter setting method 1011.

The fourth access point 1004 corresponds to the fourth automatic communication parameter setting method 1010. The fifth access point 1007 corresponds to a sixth automatic communication parameter setting method 1012.

In the second embodiment, the access points and wireless terminal store encryption keys corresponding to automatic communication parameter setting schemes supported by the access points and wireless terminal. If instruments that are to automatically set the communication parameters successfully carry out authentication using any encryption key, they set the communication parameters by the automatic communication parameter setting method corresponding to the encryption key.

Now, with reference to FIGS. 12 to 14, description will be given of a process for automatically setting the communication parameters on the basis of the encryption keys stored in the wireless terminal 1001, fourth access point 1004, and fifth access point 1007.

FIG. 12 is a diagram showing an exemplary encryption key for authentication which is used in an automatic communication parameter setting method. As shown in FIG. 12, the fourth automatic communication parameter setting method 1010 carries out authentication using an encryption key 1201. The fifth automatic communication parameter setting method 1011 carries out authentication using an encryption key 1202. The sixth automatic communication parameter setting method 1012 carries out authentication using an encryption key 1203.

Figure 13:
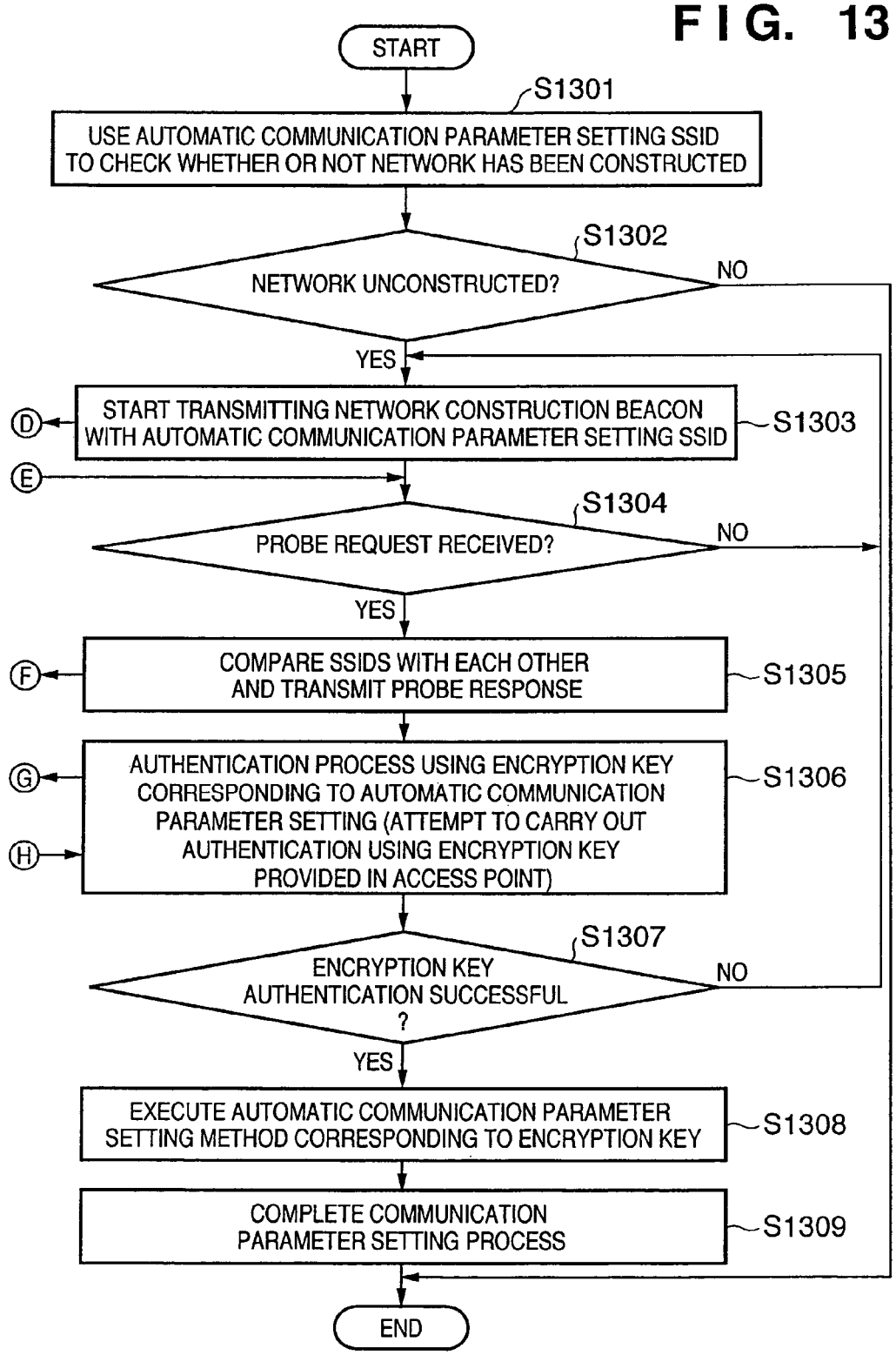
FIG. 13 is a flowchart showing an automatic communication parameter setting process at the access point.

FIG. 13 is a flowchart showing an automatic communication parameter setting process at the access point. Description will be given of a process in which the fourth access point 1004 and wireless terminal 1001 in the configuration shown in FIG. 10 automatically set the communication parameters.

The user depresses an automatic communication parameter setting activation button 1006. The fourth access point 1004 then uses an arbitrary SSID (SSID=XYZ) to check whether or not a wireless network has already been constructed (step S1301). If no network has been constructed (YES in step S1302), the fourth access point 1004 constructs a wireless network and starts transmitting a beacon containing the SSID=XYZ (step S1303).

The fourth access point 1004 subsequently waits to receive a probe request containing the SSID=XYZ from the wireless terminal 1001 (step S1304). Upon receiving the probe request, the fourth access point 1004 compares the SSID contained in the probe request with the SSID for the wireless network constructed by itself. When the SSIDs match each other (YES in step S1304), the fourth access point 1004 transmits a probe response to the wireless terminal 1001 (step S1305).

The fourth access point 1004 and wireless terminal 1001 then carry out authentication using the encryption key 1201 corresponding to the fourth automatic communication parameter setting method 1010 (step S1306). If the authentication is successful (YES in step S1307), the communication parameters corresponding to the encryption key are automatically set (step S1308). That is, the fourth access point 1004 and wireless terminal 1001 use the fourth automatic communication parameter setting method 1010 to set the communication parameters. Once the communication parameters are completely set (step S1309), wireless communication using the set communication parameters is enabled.

Figure 14:
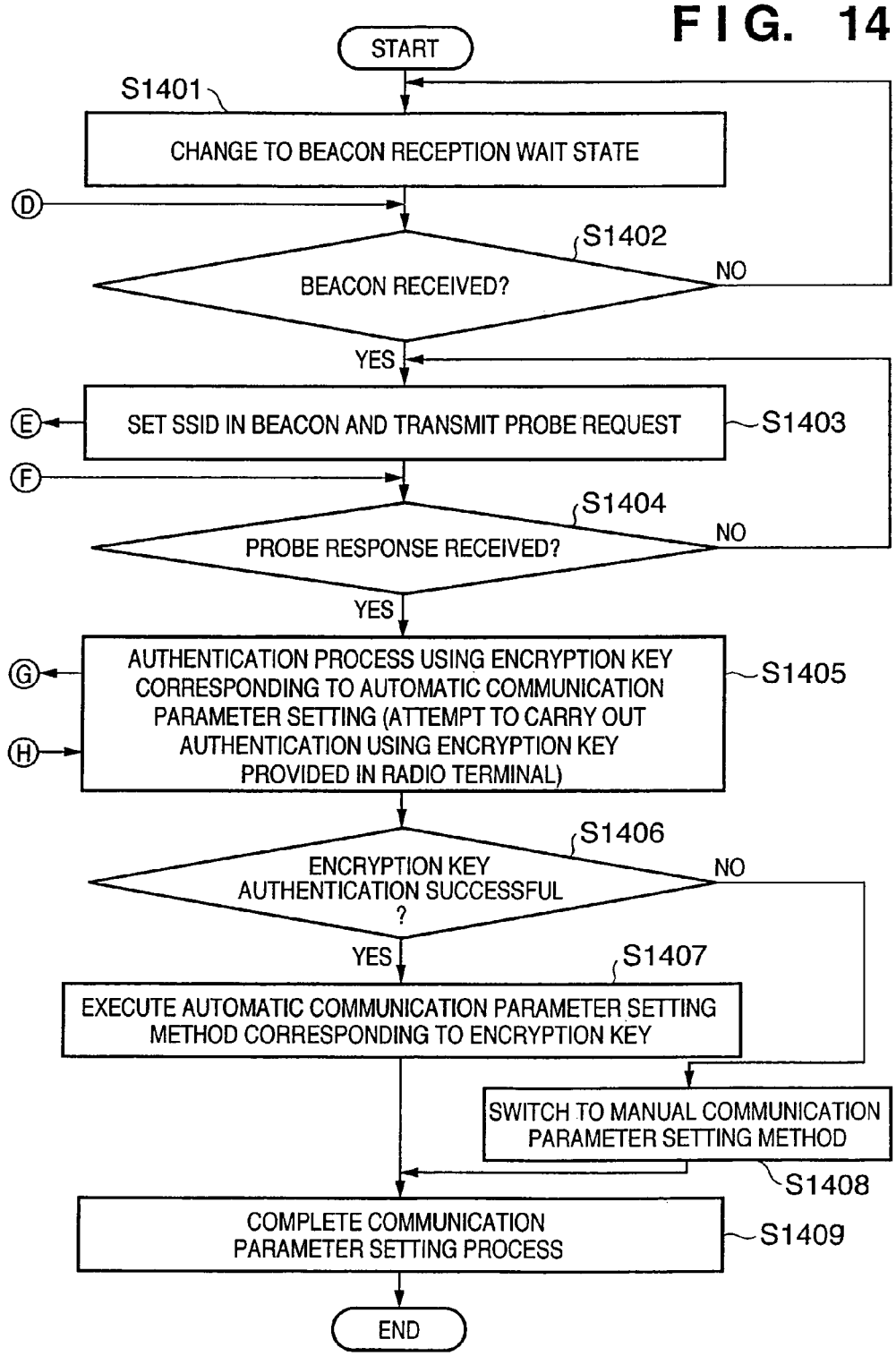
FIG. 14 is a flowchart showing an automatic communication parameter setting process in the wireless terminal 1001.

FIG. 14 is a flowchart showing an automatic communication parameter setting process in the wireless terminal 1001. Now, description will be given of the automatic communication parameter setting process executed in the configuration shown in FIG. 10.

The user depresses the automatic communication parameter setting activation button 1003. This causes the wireless terminal 1001 to wait to receive a beacon (step S1401). Subsequently, upon receiving the beacon with the SSID=XYZ from the fourth access point 1004 (YES in step S1402), the wireless terminal 1001 uses the received SSID=XYZ to transmit a probe request to the fourth access point 1004 (step S1403). The wireless terminal 1001 then receives a probe response to the probe request and thus a request for encryption key authentication, from the fourth access point 1004 (step S1404). The wireless terminal 1001 then executes an encryption key authentication process corresponding to the automatic communication parameter setting (step S1405). In other words, the wireless terminal 1001 and fourth access point 1004 carry out authentication using the encryption keys 1201 and 1202 corresponding to the fourth and fifth automatic communication parameter settings stored in the wireless terminal 1001.

In this example, authentication with the encryption key 1201 is possible. This indicates that the authentication is successful (YES in step S1406). The wireless terminal 1001 then sets the communication parameters by the fourth automatic communication parameter setting 1010 corresponding to the encryption key 1201 (step S1407). Once the communication parameters are completely set (step S1409), wireless communication using the set communication parameters is enabled.

Now, description will be given of a process in which the fifth access point 1007 and wireless terminal 1001 in the configuration shown in FIG. 11 automatically set the communication parameters.

The user depresses an automatic communication parameter setting activation button 1009. The fifth access point 1007 then uses an arbitrary SSID (SSID=LMN) to check whether or not a wireless network has already been constructed (step S1301). If no network has been constructed (YES in step S1302), the fifth access point 1007 constructs a wireless network and starts transmitting a beacon containing the SSID=LMN (step S1303).

The fifth access point 1007 subsequently waits to receive a probe request containing the SSID=LMN from the wireless terminal 1001 (step S1304). Upon receiving the probe request, the fifth access point 1007 compares the SSID contained in the probe request with the SSID for the wireless network constructed by itself. When the SSIDs match each other (YES in step S1304), the fifth access point 1007 transmits a probe response to the wireless terminal 1001 (step S1305).

The fifth access point 1007 and wireless terminal 1001 then carry out authentication using the encryption key 1203 corresponding to the sixth automatic communication parameter setting method 1012 (step S1303). With the configuration shown in FIG. 11, no successful encryption key authentication can be confirmed. The fifth access point 1007 transmits information on authentication error to the wireless terminal 1001 (step S1306). The procedure returns to step S1303 to repeat the above process.

Description will be given of the automatic communication parameter setting process executed by the wireless terminal 1001 in the configuration shown in FIG. 11.

The user depresses the automatic communication parameter setting activation button 1003. This causes the wireless terminal 1001 to wait to receive a beacon (step S1401). Subsequently, upon receiving the beacon with the SSID=LMN from the fifth access point 1007 (YES in step S1402), the wireless terminal 1001 uses the received SSID=LMN to transmit a probe request to the fifth access point 1007 (step S1403). The wireless terminal 1001 then receives a probe response to the probe request and thus a request for encryption key authentication, from the fifth access point 1007 (step S1404). The wireless terminal 1001 then executes an encryption key authentication process corresponding to the automatic communication parameter setting (step S1405). In other words, the wireless terminal 1001 and fifth access point 1007 carry out authentication using the encryption keys 1201 and 1202 corresponding to the fourth and fifth automatic communication parameter settings stored in the wireless terminal 1001.

In this example, the authentication fails, and the wireless terminal 1001 receives a response indicating an authentication error, from the fifth access point 1007 (NO in step S1406). The wireless terminal 1001 determines that the communication parameters cannot be set by any automatic setting method (step S1406). The wireless terminal 1001 then switches to manual setting of the communication parameters (step S1408).

Thus, in the present embodiment, the wireless terminal stores the encryption keys corresponding to the automatic communication parameter setting methods supported by itself. The wireless terminal and the access point authenticated via any of the encryption keys then set the communication parameters by the corresponding automatic setting method. Therefore, the wireless terminal and the access point supporting the common automatic communication parameter setting method can easily set the communication parameters while ensuring high security.

The communication parameter setting network is constructed in response to depression of the automatic communication parameter setting activation button at the access point. This allows the communication parameters to be set only as desired by the user, ensuring security. The present embodiment also avoids the wasteful use of the wireless communication line.

The search process is executed in response to depression of the automatic communication parameter setting activation button at the wireless terminal. This allows the communication parameters to be set only as desired by the user, ensuring security. The present embodiment also avoids the wasteful use of the wireless communication line.

Third Embodiment

Now, a third embodiment according to the present invention will be described below in detail with reference to the drawings.

FIG. 15 is a diagram showing the exemplary configuration of a wireless LAN system according to the third embodiment. As shown in FIG. 15, a wireless LAN system is composed of the wireless terminal 1001, fourth access point 1004, and fifth access point 1007, which are used in the second embodiment.

The automatic communication parameter setting process for the fourth access point 1004 and fifth access point 1007 is similar to that shown in the flowchart in FIG. 13, described for the second embodiment. The description of this automatic communication parameter setting method is thus omitted.

Now, with reference to FIG. 14, description will be given of an automatic communication parameter setting process executed by the wireless terminal 1001.

The user depresses the automatic communication parameter setting activation button 1003. This causes the wireless terminal 1001 to wait to receive a beacon (step S1401). The wireless terminal 1001 subsequently receives a beacon with the SSID=XYZ from the fourth access point 1004 and a beacon with the SSID=LMN from the fifth access point 1007 (YES in step S1402). The wireless terminal 1001 uses the SSID=XYZ and SSID=LMN in the received beacon to sequentially transmit probe requests to the fourth access point 1004 and fifth access point 1007 (step S1403). The wireless terminal 1001 receives a probe response to the probe request (YES in step S1404). The wireless terminal 1001 and the access point having transmitted the probe response then execute an encryption key authenticating process (step S1405). Specifically, the wireless terminal 1001 and each access point carry out authentication using the encryption keys 1201 and 1202 corresponding to the fourth and fifth automatic communication parameter setting methods stored in the wireless terminal 1001. If it is found that the wireless terminal 1001 and either of the fourth and fifth access points can automatically set the communication parameters (YES in step S1406), the wireless terminal 1001 and that access point use the automatic communication parameter setting to set the communication parameters (step S1407).

The third embodiment enables authentication using the fourth access point 1004 and encryption key 1202 and allows a success in this authentication to be confirmed. Accordingly, the wireless terminal 1001 and fourth access point 1004 set the communication parameters by the fifth automatic communication parameter setting 1011 corresponding to the encryption key 1202. Once the communication parameters are completely set (step S1409), wireless communication using the set communication parameters is enabled.

If a plurality of access points are detected which support the automatic communication parameter setting methods common to the wireless terminal, various methods are possible for selecting an access point that is to set the communication parameters.

For example, the display section may indicate detection of a plurality of access points supporting the common automatic communication parameter setting methods so that the user can select which access point to carry out automatic setting. Alternatively, the wireless terminal may pre-store identification information on an access point to be given priority in connection so that the wireless terminal and this access point can set the communication parameters.

Thus, according to the present embodiment, even if the wireless terminal is located where it can communicate with a plurality of access points, it can automatically set the communication parameters in cooperation with the access point corresponding to the common automatic communication parameter setting scheme. Further, the communication parameters are set by the automatic setting method corresponding to the encryption key. This enables the communication parameters to be easily set, while ensuring security.

As described above, the above embodiments enable the communication parameters to be more easily set. Further, the communication parameters are automatically set by the method corresponding to the communication parameter setting network identifier for each access point, that is, the encryption key for each access point. This enables the parameters to be set while maintaining security. Furthermore, if the parameters cannot be automatically set, the setting method is switched to a manual operation. This enables the parameters to be reliably set.

The present invention may be applied to a system composed of a plurality of instruments (for example, a host computer, interface instrument, reader, and printer) or an apparatus consisting of one instrument (for example, a copier or facsimile apparatus).

Of course, the object of the present invention can also be achieved as follows. The system or apparatus is supplied with a recording medium on which software program codes that implement the functions of the above embodiments are recorded. A computer (CPU or MPU) in the system or apparatus reads and executes the program codes stored in the recording medium.

In the above case, the program codes read from the recording medium implement the functions of the present embodiments. The recording medium storing the program codes constitutes the present invention.

Examples of the recording medium that supplies the program codes include, for example, a floppy (registered trade mark) disk, a hard disk, an optical disk, a magneto optic disk, a CD-ROM, a CD-R, a magnetic tape, a nonvolatile memory card, and a ROM.

The functions of the above embodiments are implemented by executing the program codes read from the computer. However, the functions of the above embodiments may of course be implemented by allowing an OS (Operating System) operating on the computer to execute a part or all of the actual process on the basis of the instructions in the program codes.

Of course, the functions of the above embodiments may also be implemented as follows. The program codes read from the recording medium are written to a memory provided in an expanded board inserted into the computer or an expanded unit connected to the computer. A CPU provided in the expanded board or unit executes a part or all of the actual process on the basis of the instructions in the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-302165, filed Oct. 17, 2005, and Japanese Patent Application No. 2006-234367, filed Aug. 30, 2006, which are hereby incorporated by reference herein in their entirety.

What is claimed is:

1. A method for setting communication parameters for a wireless network between communication apparatuses, the communication parameters including encryption information and authentication information for wireless communication, the method comprising:

a detection step of detecting a network identifier for identifying the wireless network;

a selection step of selecting a communication parameter setting method corresponding to the network identifier detected in the detection step from among a plurality of communication parameter setting methods, wherein the communication parameter setting method comprises a method for setting the communication parameters for communicating over the wireless network between communication apparatuses by transmitting the communication parameters from one communication apparatus to other communication apparatuses using predetermined procedures and messages in order to set the communication parameters to the respective communication apparatus, and wherein each communication parameter setting method differs from other communication parameter setting methods in the procedures or messages for setting the communication parameters;

a connection step of connecting to a communication parameter setting wireless network, which is used for setting the communication parameters and is identified by the network identifier detected in the detection step, for performing the setting by the communication parameter setting method selected in the selection step; and a setting step of setting the communication parameters for data communication by using the selected communication parameter setting method in the communication parameter setting wireless network connected in the connection step.

2. The method according to claim 1, wherein if the network identifier detected in the detection step matches a network identifier provided in one of the communication apparatuses, the communication parameters are automatically set by the communication parameter setting method corresponding to the network identifier.

3. The method according to claim 1, wherein if the network identifier detected in the detection step does not match the network identifier provided in the communication apparatus, the setting of the communication parameters is switched to a manual operation.

4. The method according to claim 1, further comprising:
an authentication step of carrying out authentication between the communication apparatuses,
wherein the communication parameter setting method is selected in accordance with a result of authentication in the authentication step, and
wherein the communication parameters are set corresponding to information used for the authentication.

5. The method according to claim 4, wherein the information used for the authentication contains an encryption key.

6. The method according to claim 4, wherein the setting step determines whether to automatically or manually set the communication parameters in accordance with the authentication in the authentication step.

7. A program recorded on a computer readable recording medium and allowing a computer to execute the communication parameter setting method according to claim 4.

8. A computer readable recording medium on which a program allowing a computer to execute the communication parameter setting method according to claim 4 is recorded.

9. A program recorded on a computer readable recording medium and allowing a computer to execute the communication parameter setting method according to claim 1.

10. A computer readable recording medium on which a program allowing a computer to execute the communication parameter setting method according to claim 1 is recorded.

11. A communication apparatus that sets communication parameters including encryption information and authentication information for wireless communication in a wireless network, comprising:
a detection unit constructed to detect a network identifier for identifying the wireless network;
a selection unit constructed to select a communication parameter setting method corresponding to the network identifier detected by the detection unit from among a plurality of communication parameter setting methods, wherein the communication parameter setting method comprises a method for setting the communication parameters for communicating over the wireless network between communication apparatuses by transmitting the communication parameters from one communication apparatus to other communication apparatuses using predetermined procedures and messages in order to set the communication parameters to the respective communication apparatus, and wherein each communication parameter setting method differs from other communication parameter setting methods in the procedures or messages for setting the communication parameters;
a connection unit constructed to connect to a communication parameter setting wireless network, which is used for setting the communication parameters and is identified by the network identifier detected by the detection unit, for performing the setting by the communication parameter setting method selected by the selection unit; and
a setting unit constructed to set the communication parameters for data communication by using the selected communication parameter setting method in the communication parameter setting wireless network connected by the connection unit.

12. The apparatus according to claim 11, wherein whether to automatically or manually set the communication parameters is determined depending on whether the network identifier detected by the detection unit matches a network identifier provided in the communication apparatus.

13. The apparatus according to claim 11, further comprising:
a determination unit constructed to determine whether or not authentication between the communication apparatus and another communication apparatus is successful,
wherein the setting unit is constructed, depending on the determination by the determination unit, to set the communication parameters by using a communication parameter setting method corresponding to information used for the authentication.

14. The apparatus according to claim 13, wherein the information used for the authentication contains an encryption key.

15. The apparatus according to claim 13, wherein the setting means determines whether to automatically or manually set the communication parameters depending on the determination by the determination means.

* * * * *